(12) United States Patent
Wang et al.

(10) Patent No.: US 10,235,772 B2
(45) Date of Patent: Mar. 19, 2019

(54) INSTALLATION ERROR DISPLAY CONTROL APPARATUS AND INSTALLATION ERROR DETECTION APPARATUS OF ONBOARD CAMERA

(71) Applicant: DENSO CORPORATION, Kariya, Aichi-pref. (JP)

(72) Inventors: Bingchen Wang, Kariya (JP); Masakazu Takeichi, Kariya (JP); Muneaki Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 137 days.

(21) Appl. No.: 15/128,817

(22) PCT Filed: Mar. 24, 2015

(86) PCT No.: PCT/JP2015/001678
§ 371 (c)(1),
(2) Date: Sep. 23, 2016

(87) PCT Pub. No.: WO2015/159489
PCT Pub. Date: Oct. 22, 2015

(65) Prior Publication Data
US 2017/0103546 A1    Apr. 13, 2017

(30) Foreign Application Priority Data

Apr. 16, 2014    (JP) .................................. 2014-084509

(51) Int. Cl.
*G06K 9/00*        (2006.01)
*G06T 7/80*        (2017.01)
(Continued)

(52) U.S. Cl.
CPC ................. *G06T 7/80* (2017.01); *B60R 1/00* (2013.01); *B60R 11/04* (2013.01); *G06T 7/0006* (2013.01);
(Continued)

(58) Field of Classification Search
CPC ........... G06T 7/80; G06T 7/73; G06T 7/0006; G06T 2207/30252; G06T 2207/30244;
(Continued)

(56) References Cited

U.S. PATENT DOCUMENTS 8,508,657 B2 *  8/2013  Sogawa .............. G01B 11/272
                                                          348/373
8,670,034 B2 *  3/2014  Hattori ..................... B60R 1/00
                                                          345/620
(Continued)

FOREIGN PATENT DOCUMENTS

JP      H06-215134 A    8/1994
JP      2001-233139 A   8/2001
(Continued)

*Primary Examiner* — Sheela C Chawan
(74) *Attorney, Agent, or Firm* — Knobbe, Martens, Olson & Bear, LLP (57) ABSTRACT

An installation error detection apparatus of an onboard camera includes: an input portion that receives a photographed image; a storage portion that stores position information of a feature point of the vehicle; a feature point detection portion; a determination portion that determines whether the installation position of the onboard camera is the proper position; and a notification portion that informs installation defect of the onboard camera. The notification portion calculates the installation position of the onboard camera required to minimize the deviation amount and corrects the photographed image by the onboard camera. The notification portion detects the feature point and calculates a similarity degree of the position of the feature point and the position information. The notification portion deter- (Continued)

mines the installation defect of the onboard camera and informs the installation defect. The notification portion determines that a vehicle body is deformed and informs the vehicle body being deformed.

1 Claim, 6 Drawing Sheets (51) Int. Cl.
  *B60R 11/04*   (2006.01)
  *H04N 5/232*   (2006.01)
  *H04N 5/265*   (2006.01)
  *G06T 7/73*   (2017.01)
  *B60R 1/00*   (2006.01)
  *G06T 7/00*   (2017.01)
(52) U.S. Cl.
  CPC ........... *G06T 7/73* (2017.01); *H04N 5/23293* (2013.01); *H04N 5/265* (2013.01); *B60R 2300/402* (2013.01); *B60R 2300/607* (2013.01); *B60R 2300/8066* (2013.01); *G06T 2207/30244* (2013.01); *G06T 2207/30252* (2013.01)
(58) Field of Classification Search
  CPC ..... B60R 1/00; B60R 11/04; B60R 2300/402; B60R 2300/607; B60R 2300/8066; H04N 5/23293; H04N 5/265
  USPC ........ 382/195, 103, 104, 105.149, 190, 199, 382/181, 100, 203, 149; 348/61, 143, 348/148, 175, 180, 187, 188; 701/1, 3, 4, 701/400, 408, 467, 469; 702/85, 94, 95, 702/127, 150, 152
  See application file for complete search history.

(56) References Cited

U.S. PATENT DOCUMENTS

2008/0316011 A1\* 12/2008 Kirsch ................... B60K 35/00
  340/439
2013/0215280 A1\* 8/2013 Maekawa ............ H04N 17/004
  348/187
2015/0161457 A1\* 6/2015 Hayakawa ............. G08G 1/166
  348/46

FOREIGN PATENT DOCUMENTS

| JP | 2002-074339 A | 3/2002 |
| JP | 2007-256030 A | 10/2007 |
| JP | 2013-129264 A | 7/2013 |
| JP | 2014-054354 A | 3/2014 |
| JP | 2014-082622 A | 5/2014 |

\* cited by examiner

INSTALLATION ERROR DISPLAY CONTROL APPARATUS AND INSTALLATION ERROR DETECTION APPARATUS OF ONBOARD CAMERA

CROSS REFERENCE TO RELATED APPLICATIONS

The present application is based on Japanese Patent Application No. 2014-84509 filed on Apr. 16, 2014, the disclosure of which is incorporated herein by reference.

TECHNICAL FIELD

The present disclosure relates to an installation error display control apparatus of an onboard camera that is suitable to determine whether a position of an onboard camera is a proper position, and an installation error detection apparatus of an onboard camera.

BACKGROUND ART

Conventionally, there has been known a technology (for example, refer to Patent Literature 1) whereby two markers provided in right and left fenders of a vehicle is detected out of a photographed image of a vehicle periphery by an onboard camera, and an effective area in the photographed image is set so that respective markers may take specific positions set up in advance.

The inventors of the present application have found out the following. With a technology described in Patent Literature 1, since a deviation of an installation position of an onboard camera is detected using a marker whose installation position is known, the technology cannot necessarily apply to any onboard camera due to a disposition restriction of the marker.

PRIOR ART LITERATURE

Patent Literature

Patent Literature 1: JP2001-233139 A

SUMMARY OF INVENTION

It is and an object of the present disclosure to provide an installation error display control apparatus of an onboard camera capable of determining whether an installation position of an onboard camera is a proper position without using a marker provided in the vehicle, and an installation error detection apparatus of the onboard camera.

The installation error display control apparatus of an onboard camera according to one mode of the present disclosure includes an input portion receiving the photographed image by the onboard camera and a storage portion storing position information of a feature point of the vehicle that appears in the photographed image by the onboard camera when the onboard camera is installed to the proper position.

A feature point superimposition portion superimposes an image based on the feature point on the photographed image received from the input portion based on the position information stored in the storage portion, and an image output portion outputs the photographed image to which the image based on the feature point is superimposed, to the display device.

According to the installation error display control apparatus of an onboard camera of the present disclosure, a user can easily judge whether the installation position of the onboard camera is deviated from the proper position (in other words, whether there is an installation error) or how much it is deviated from the proper position by making the display device display an output image from the image output portion and checking a display screen.

According to the installation error display control apparatus of an onboard camera of the present disclosure, it can be determined whether the onboard camera is installed to the proper position without providing a marker on the vehicle body, it is not necessary to dispose the onboard camera in a position in which the camera can photograph the marker, and the installation error display control apparatus can apply to any onboard cameras.

An installation error detection apparatus of an onboard camera according to another mode of the present disclosure includes an input portion receiving the photographed image by the onboard camera, and a storage portion storing the position information of the feature point of the vehicle that appears in the photographed image by the onboard camera when the onboard camera is installed to the proper position.

A feature point detection portion detects the feature point of the vehicle out of the photographed image received from the input portion, and a determination portion determines whether the installation position of the onboard camera is the proper position based on a position of the detected feature point in the photographed image and the position information stored in the storage portion. When the determination portion determines that the installation position of the onboard camera is an improper position, an notification portion informs installation defect of the onboard camera.

According to the installation error detection apparatus of an onboard camera of the present disclosure, the apparatus can automatically determines whether the installation position of the onboard camera is located in the proper position and, when the installation position of the onboard camera is deviated from the proper position, can notify the user of the deviation.

According to the installation error detection apparatus of an onboard camera of the present disclosure, it can be detected whether the installation position of the onboard camera is located in the proper position (in other words, the installation error), without using a marker provided on the vehicle body; therefore, the installation error detection apparatus is applicable to any onboard cameras.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

Hereinafter, embodiments to which the present disclosure is applied will be explained with reference to the drawings.

Incidentally, the present disclosure shall not be limited to and interpreted by the embodiments at all. Moreover, a mode in which a part of the configuration of the embodiment is omitted as long as the problem could be solved is also an embodiment of the present disclosure. Moreover, a mode that is constituted by combining multiple embodiments suitably is also an embodiment of the present disclosure. Moreover, all modes that can be considered within a limit that does not deviate from an essence of the present disclosure are also embodiments of the present disclosure.

First Embodiment

Figure 1:
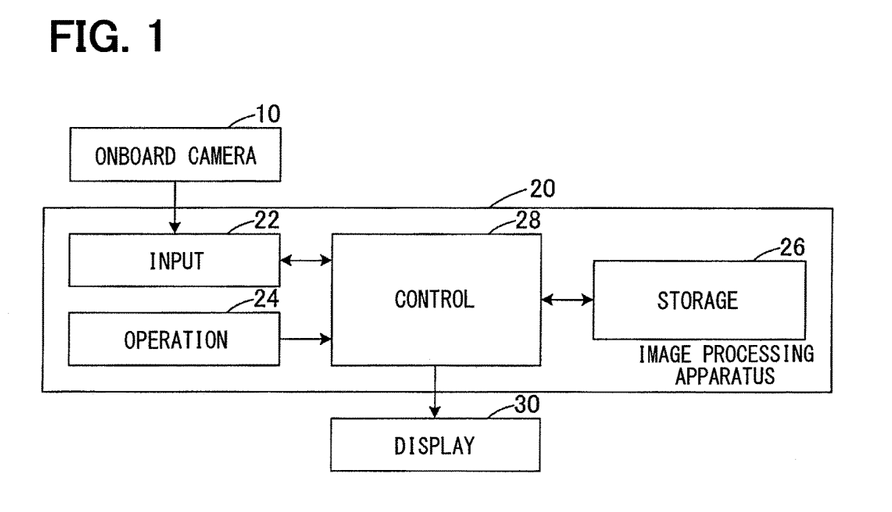
FIG. 1 is a block diagram showing a configuration of an image processing system of a first embodiment.

As shown in FIG. 1, the image processing system of the present embodiment includes an onboard camera 10, an image processing system 20, and a display device 30.

Figure 2:
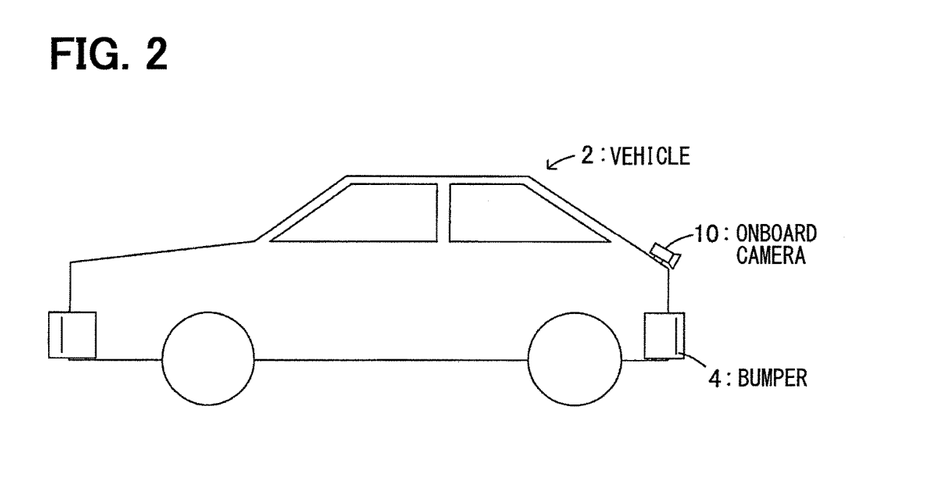
FIG. 2 is a diagram showing an installation position of an onboard camera to a vehicle.

The onboard camera 10 is a camera that has an image sensor element such as CCD and CMOS, and is placed to a rear upper part of a vehicle 2, which photographs a rear periphery of the vehicle 2.

Then, the onboard camera 10 outputs a photographed image of the rear of the vehicle to the image processing system 20 at a predetermined frequency (for example, 60 frames in one second).

Incidentally, in the present embodiment, as a feature point of the vehicle 2, the onboard camera 10 is installed to the vehicle 2 so that a bumper 4 of the rear of the vehicle may appear in the photographed image.

Next, the display device 30 is constituted of a liquid crystal display, an organic EL display, or the like, and displays an image processed by the image processing system 20 based on a photographed image by the onboard camera 10.

Moreover, the image processing system 20 corresponds to an installation error display control apparatus of the onboard camera of the present disclosure, and includes an input portion 22, an operation portion 24, a storage portion 26, and a control portion 28.

The input portion 22 is constituted of a storage device, such as DRAM, takes in the photographed image outputted sequentially from the onboard camera 10, and stores it for a predetermined period (for example, past 10 seconds).

The operation portion 24 is for a user such as a driver to input various operation instructions to the control portion 28, and is constituted of a touch panel provided on a display surface of the display device 30, mechanical key switches that are installed in the periphery of the display device 30.

The storage portion 26 is constituted of a nonvolatile storage device such as flash memory, and is a device for storing data necessary to process a program that the control portion 28 executes and the photographed images by the onboard camera 10.

Then, especially in the present embodiment, the storage portion 26 stores position information of the onboard camera 10, feature point information used to detect the feature point (in the present embodiment, the bumper 4) out of the photographed image, reference position information showing a position of the feature point in the photographed image when the onboard camera 10 is in a proper position, in addition to conversion data necessary to convert the photographed image by the onboard camera 10 into a display image to the display device 30.

Incidentally, the position information of the onboard camera 10 is, for example, information showing a position of the onboard camera 10 when the onboard camera 10 is installed in the proper position and a calibration is performed, which includes information showing the position on axes of front-rear, horizontal, and vertical directions (namely, x-, y-, and z-coordinates) in a vehicle body and inclinations around these axes (a roll, a pitch, and a yaw).

Moreover, the feature point information is shape data necessary to recognize the bumper 4 that is the feature point of the vehicle body, out of the photographed image by the onboard camera 10. The reference position information of the feature point is coordinate information showing a position (for example, a center position) of the bumper 4 in the photographed image.

Next, the control portion 28 is constituted of a microcomputer that includes a CPU, RAM, ROM, an I/O, or the like.

Figure 3:
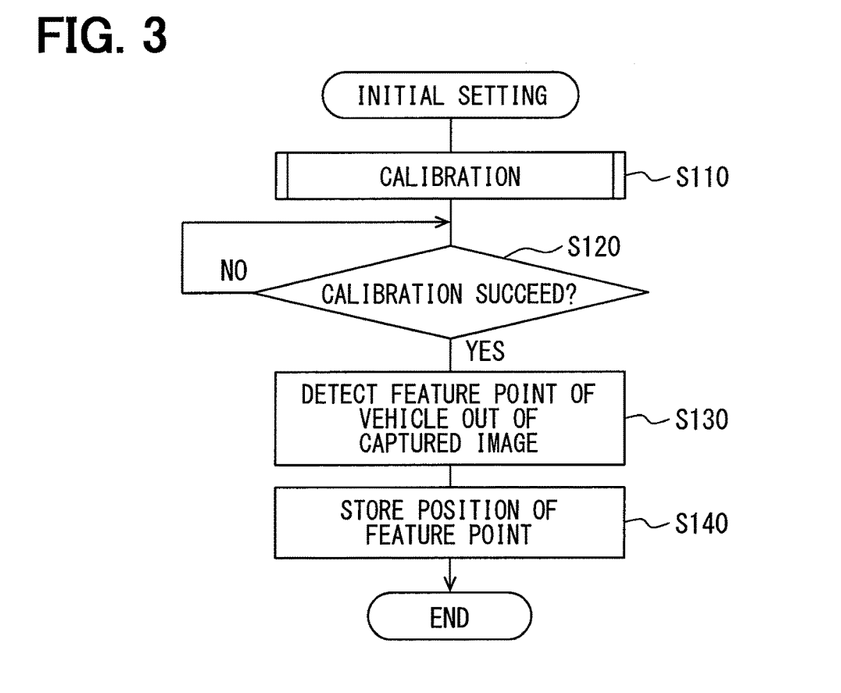
FIG. 3 is a flowchart showing initial setting processing that is performed by the image processing system.

When the vehicle 2 is installed with the onboard camera 10 and the initial setting processing shown in FIG. 3 is performed according to an instruction from the outside, the control portion 28 executes the initial setting processing shown in FIG. 3. When the photographed image by the onboard camera 10 is made to be displayed on the display device 30 according to an instruction from the outside, the control portion 28 executes the image display processing shown in FIG. 4. Hereinafter, these pieces of processing are explained.

The initial setting processing shown in FIG. 3 is processing that is executed to perform calibration of the onboard camera 10 at the time of the onboard camera 10 being installed to the proper position in a factory or the like, and when the processing is started, known calibration processing is performed in S110.

In S120, it is determined whether the calibration by the calibration processing succeeds. When the calibration has succeeded (calibration success), the flow shifts to S130. Moreover, when the calibration has not succeeded, the flow shifts to S110 again and continues the calibration processing.

Incidentally, in the calibration processing of S110, in addition to a calibration result (for example, the conversion data required to convert the photographed image by the onboard camera 10 into the display image to the display device 30 (for example, bird's-eye view image)), the position information of the onboard camera 10 at the time of performing the calibration is also stored.

In S130, the photographed image by the onboard camera 10 is taken in from the input portion 22, and the bumper 4 that is the feature point of the vehicle 2 in the photographed image is detected based on the shape data stored in advance in the storage portion 26.

In S140, the position on the photographed image of the feature point (the bumper 4) detected in S130 is stored in the storage portion 26 as the reference position information of the feature point, and the initial setting processing terminates.

Figure 4:
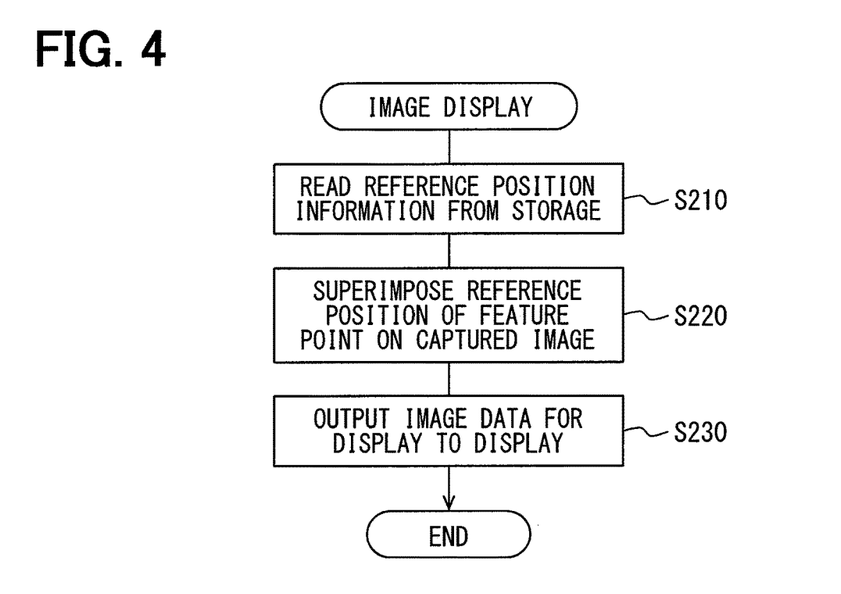
FIG. 4 is a flowchart showing image display processing that is performed by the image processing system.

The image display processing shown in FIG. 4 is processing that makes the display device 30 display an image (for example, a bird-eye view image) by converting the photographed image by the onboard camera 10 into image data for display based on the conversion data obtained by the calibration described above and outputting it to the display device 30.

In this image display processing, in S210, the reference position information of the feature point (the bumper 4) is read from the storage portion 26.

Figure 5:
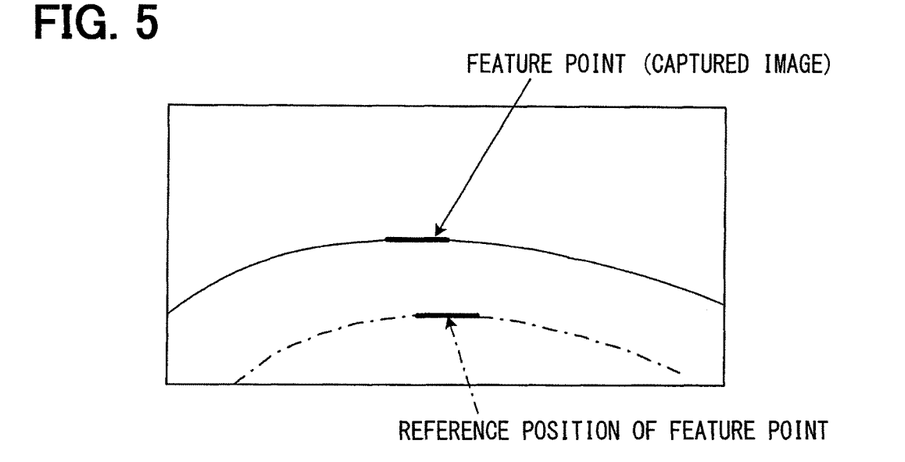
FIG. 5 is a diagram explaining a display screen of a display device by photographed image display processing.

In S220, an image showing the reference position of the feature point (the bumper 4) (for example, a pattern shown by an alternate long and short dash line in FIG. 5) is superimposed on the photographed image obtained from the input portion 22 based on the reference position information of the feature point (the bumper 4) read in S210. Incidentally, although the alternate long and short dash line showing the reference position of the feature point is taken as an example in the present embodiment to show an "image based on the feature point," the present disclosure is not limited to this, and, for example, an image showing a predetermined width centering on the reference position of the bumper may be superimposed and displayed as the "image based on the feature point."

In S230, the photographed image to which the image showing the reference position of the feature point (the bumper 4) in S220 is superimposed is converted into the image data for display based on the conversion data stored in the storage portion 26, which is outputted to the display device 30.

Thus, the display device 30 displays an image indicating the position of the feature point when the onboard camera 10 is installed to the proper position together with the photographed image in which the bumper 4 that is the feature point appears, as shown by a solid line in FIG. 5.

Thus, the user can judge easily whether an installation position of the onboard camera 10 is the proper position from the display image onto the display device 30.

Second Embodiment

An image processing system of a second embodiment, like the image processing system of the first embodiment shown in FIG. 1, includes the onboard camera 10, the image processing system 20, and the display device 30.

Figure 6:
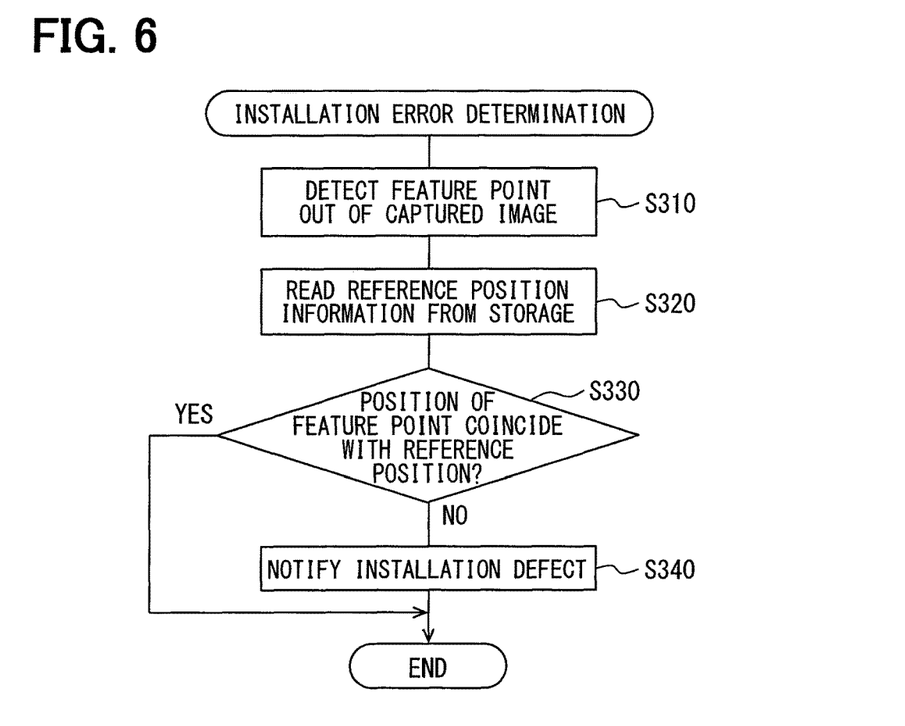
FIG. 6 is a flowchart showing installation error determination processing of a second embodiment.

Then, difference from the first embodiment is that, in the image processing system 20, the control portion 28 functions as an installation error detection apparatus of an onboard camera of the present disclosure by executing installation error determination processing of FIG. 6.

Therefore, in the present embodiment, explanations of a device configuration or the like are omitted and the installation error determination processing of FIG. 6 is described.

Incidentally, in the present embodiment, the control portion 28 executes the initial setting processing shown in FIG. 3 like the first embodiment. Moreover, the control portion 28 may be configured so as to execute the image display processing shown in FIG. 4 similarly with the first embodiment, or the control portion 28 may be configured so as to make the display device 30 display only the photographed image by the onboard camera 10 by executing processing of S210 and S230.

The installation error determination processing shown in FIG. 6 is, for example, processing that is executed when an ignition switch of the vehicle 2 is turned on and the image processing system 20 is started.

In this installation error determination processing, in S310, the photographed image by the onboard camera 10 is taken in from the input portion 22, and the bumper 4 that is the feature point of the vehicle 2 in the photographed image is detected based on the shape data stored in advance in the storage portion 26.

In S320, the reference position information of the feature point (the bumper 4) is read from the storage portion 26, and then in S330, it is determined whether the position of the feature point (the bumper 4) detected in S310 in the photographed image coincides with the reference position obtained from the reference position information read in S320.

Incidentally, in S330, it is determined that the position of the feature point coincides with the reference position as long as the position of the feature point in the photographed image is within a permissible range that centers the reference position obtained from the reference position information.

In S330, when the position of the feature point (the bumper 4) is determined to coincide with the reference position, the installation error determination processing terminates. Moreover, in S330, when the position of the feature point (the bumper 4) is determined not to coincide with the reference position (namely, when the installation position of the onboard camera is determined to be improper), in S340, the user is notified of installation defect of the onboard camera 10, and the installation error determination processing terminates.

Incidentally, although notification of the installation defect of the onboard camera 10 can be executed by, for example, making the display device 30 display a message indicating that the installation defect of the onboard camera 10 is occurring, in addition to this, for example, the notification may be made by voice from a loud speaker (not shown) or the notification may be made by turning on an alarm lamp for notifying abnormality (not shown).

Thus, in the image processing system of the present embodiment, by the control portion 28 of the image processing system 20 functioning as the installation error detection apparatus of an onboard camera of the present disclosure, when the position of the feature point (the bumper 4) in the photographed image by the onboard camera does not coincide with the reference position stored in the storage portion 26 as the reference position information, the installation defect of the onboard camera is informed.

Therefore, according to the image processing system of the present embodiment, when the installation position of the onboard camera 10 is deviated from the proper position at the time of performing the calibration of the onboard camera 10, the system can inform the user of the deviation and urge the user to position adjustment of the onboard camera 10.

Third Embodiment

Figure 7:
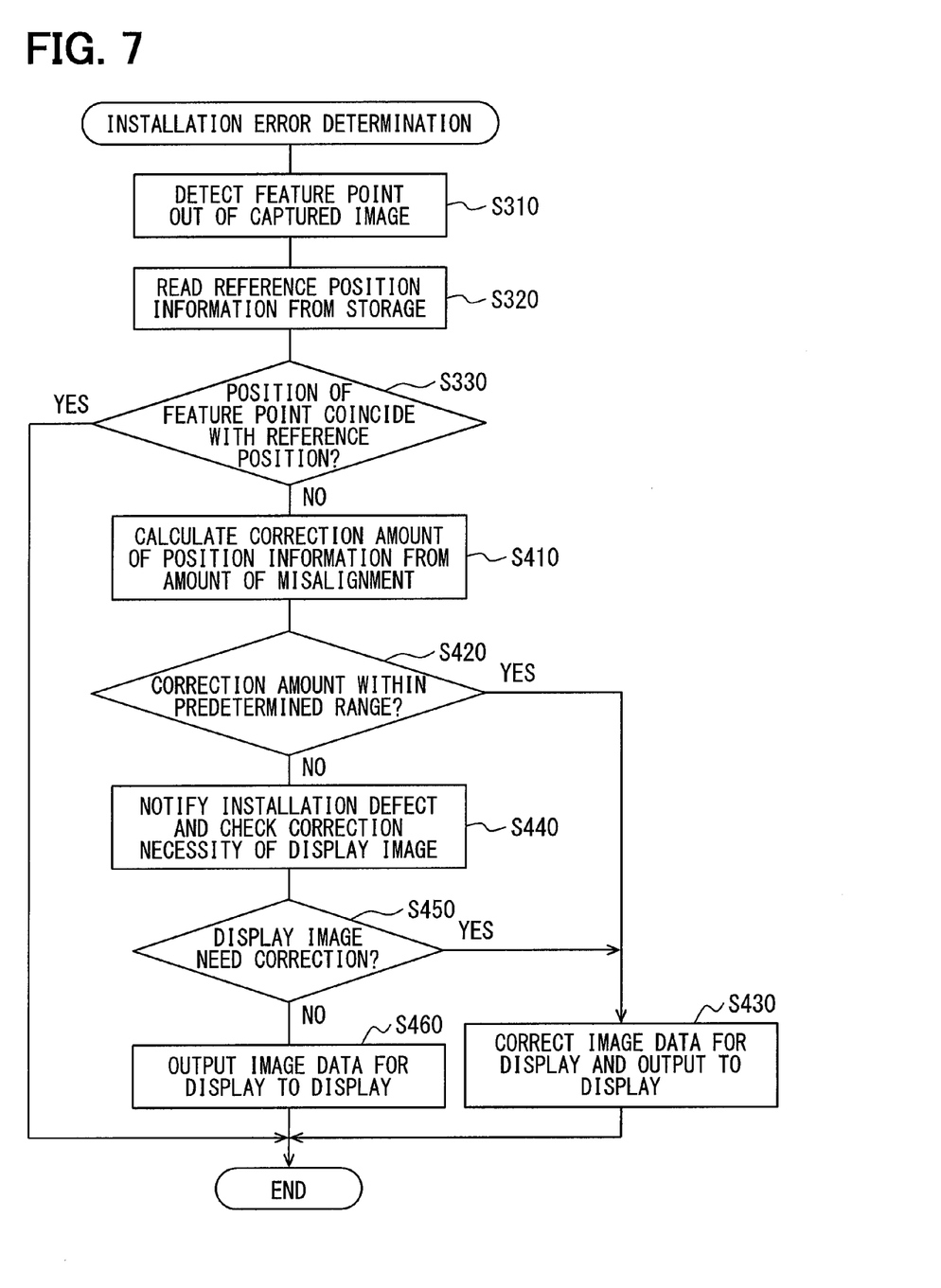
FIG. 7 is a flowchart showing installation error determination processing of a third embodiment.

An image processing system of a third embodiment is the image processing system of the second embodiment that is configured to be capable of correcting the image data for display and making the photographed image be displayed normally on the display device 30 when positional deviation of the feature point is detected on the photographed image by the onboard camera 10.

Thus, difference from the image processing system of the second embodiment is only the installation error determination processing. Therefore, in the present embodiment, the installation error determination processing is explained and explanations about other things such as configuration are omitted.

As shown in FIG. 7, in the installation error determination processing of the present embodiment, like the second embodiment shown in FIG. 6, in S310, the feature point is detected out of the photographed image, in S320, the reference position information of the feature point is read from the storage portion 26, and in S330, it is determined whether the position of the feature point coincides with the reference position.

Then, in S330, when the position of the feature point is determined to coincide with the reference position, the installation error determination processing terminates. When the position of the feature point is determined not to coincide with the reference position, the flow shifts to S410 and a correction amount of the position information of the onboard camera 10 required to make an amount of positional deviation minimum (zero) is calculated based on the amount of positional deviation relative to the reference position of the feature point.

That is, since the position information when the calibration of the onboard camera 10 is executed is stored in the storage portion 26, in S410, the correction amount of the position of the onboard camera 10 that is necessary to eliminate the deviation from the reference position of the feature point on the photographed image is calculated based on the position information.

Then, in S420, it is determined whether the correction amount calculated in S410 is within a predetermined range set in advance, when the correction amount is within the predetermined range, the flow shifts to S430, where an output action of the image data for display is set so that the image data for display may be corrected based on the correction amount calculated in S410, and may be outputted to the display device 30.

Thus, in the image display processing executed in the control portion 28 after that, in S230 of FIG. 4, when outputting the image data for display, the control portion 28 corrects the image data for display based on the correction amount calculated in S410, and a normal image in which the position of the feature point on the photographed image substantially becomes the position of the reference position is displayed on the display device 30.

Therefore, according to the image processing system of the present embodiment, even when the installation position of the onboard camera 10 is deviated from the proper position, a desired image (bird's-eye view image, etc.) is made able to be normally displayed on the display device 30.

In S420, when the correction amount calculated in S410 is determined to be not within the predetermined range, a deviation amount of the installation position of the onboard camera 10 is large. Therefore, the flow shifts to S440. Then, in S440, the installation defect of the onboard camera 10 is notified to the user, and the user is inquired about whether correction of the display image to the display device 30 is necessary.

Incidentally, notification of the installation defect of the onboard camera 10 and inquiry of the necessity of the correction of the display image may be performed by displaying a message on the display device 30, or may be performed by voice output using a loudspeaker (not shown).

In S450, as a result of inquiring necessity of the correction of the display image in S440, it is determined whether there is an input that the correction of the display image is necessary though the operation portion 24. Then, when the correction of the display image is necessary, the flow shifts to S430. When the correction of the display image is not necessary, the flow shifts to S460, where an output operation of the image data for display is set up so as to output the display image without correcting the image data for display, as it is, to the display device 30.

s, when the positional deviation of the onboard camera 10 is large, the user can detect the large deviation by the notification from the image processing system 20 and perform the position adjustment of the onboard camera 10, and also can make the correction of the display image to the display device 30 be executed and make the display device 30 display a normal image until performing the position adjustment.

Fourth Embodiment

An image processing system of a fourth embodiment is the image processing system of the second embodiment that is configured to be able to, when the positional deviation of the feature point is detected on the photographed image by the onboard camera 10, determine whether the cause of the positional deviation is due to deviation of the installation position of the onboard camera 10 (in other words, the installation defect) or due to the vehicle body deformation, and notify the user of the determination.

Figure 8:
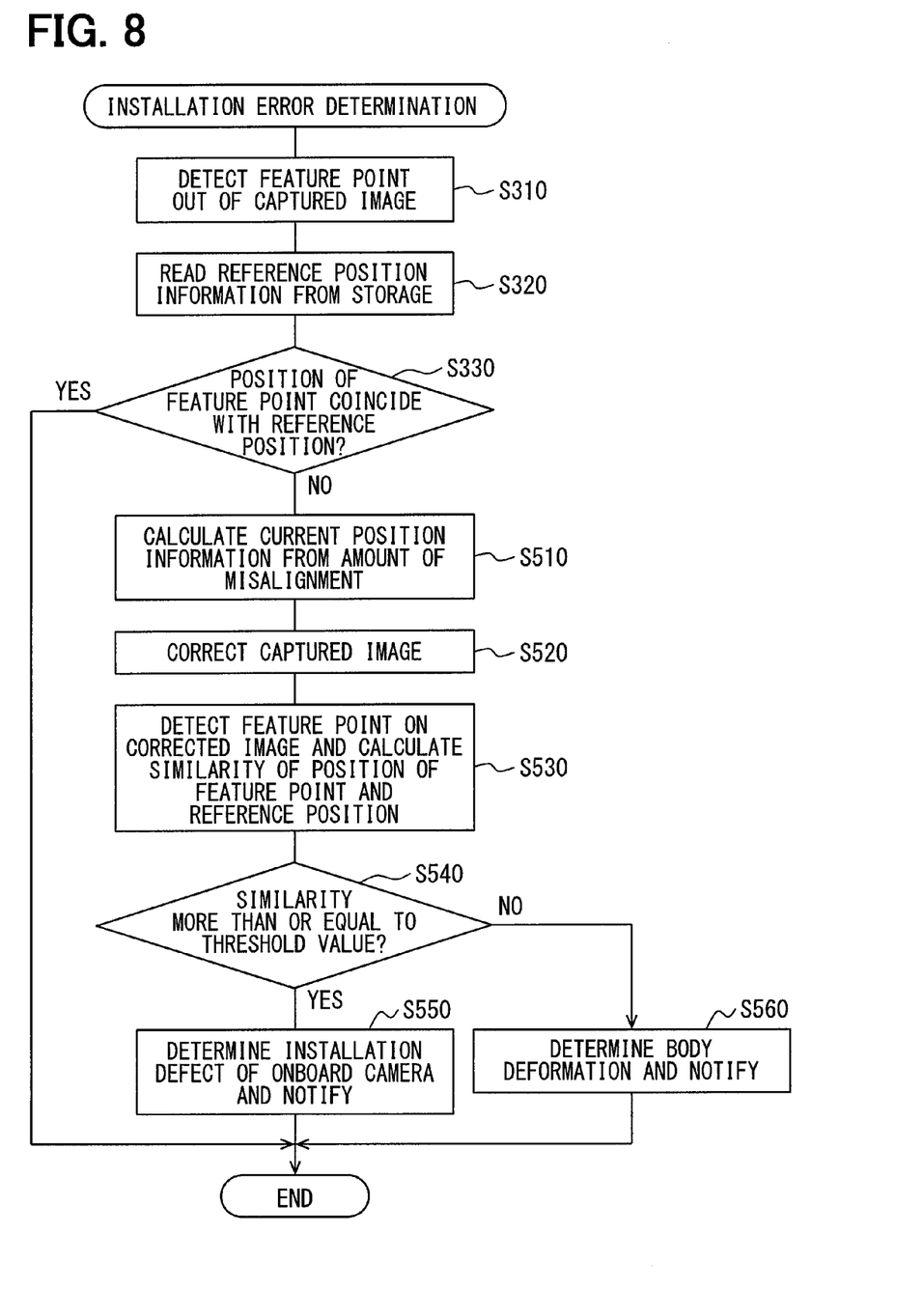
FIG. 8 is a flowchart showing installation error determination processing of a fourth embodiment.

Thus, difference from the image processing system of the second embodiment is only the installation error determination processing. Therefore, in the present embodiment, the installation error determination processing is explained and explanations about other things such as configuration are omitted.

As shown in FIG. 8, in the installation error determination processing of the present embodiment, like the second embodiment shown in FIG. 6, in S310, the feature point is detected out of the photographed image, in S320, the reference position information of the feature point is read from the storage portion 26, and in S330, it is determined whether the position of the feature point coincides with the reference position.

Then, in S330, when the position of the feature point is determined to coincide with the reference position, the installation error determination processing terminates. When the position of the feature point is determined not to coincide with the reference position, the flow shifts to S510.

In S510, current position information of the onboard camera 10 is calculated based on the amount of positional deviation relative to the reference position of the feature point on the photographed image and the position information of the onboard camera 10 stored in the storage portion 26.

For example, in S510, the photographed image is corrected by varying each of parameters (coordinates of x-, y-, and z-axes and angles of roll, pitch, and yaw described above) that constitute the position information of the onboard camera 10 stored in the storage portion 26 within a predetermined error range, and the current position information of the onboard camera 10 is calculated by searching each parameter that minimizes the amount of positional deviation of the feature point on the photographed image.

In S520, the photographed image by the onboard camera 10 is corrected based on the current position information of the onboard camera 10 obtained in S510, and then in S530, the feature point on the photographed image (a corrected image) after the correction is detected, and similarity degree of the position of the feature point and the reference position stored in the storage portion 26 is calculated.

In S540, it is determined whether the similarity degree obtained in S530 is more than or equal to the threshold value. Then, when the similarity degree is more than or equal to the threshold value, the flow shifts to S550, a cause of the positional deviation of the feature point is determined to be due to the installation defect of the onboard camera, the determination is notified to the user, and the installation error determination processing of the camera terminates.

Moreover, in S540, when the similarity degree obtained in S530 is determined to be less than the threshold value, the positional deviation of the feature point cannot not be made small even when the position information of the onboard camera 10 is corrected; therefore, the flow shifts to S560.

Then, in S560, the cause of the positional deviation of the feature point is determined to be due to deformation of the vehicle body (for example, denting of the bumper), the determination is notified to the user, and the installation error determination processing of the camera terminates.

Thus, in the image processing system of the present embodiment, when the positional deviation of the feature point is detected on the photographed image by the onboard camera 10, it is specified whether the cause of the positional deviation is due to the installation defect of the onboard camera 10 or due to vehicle body deformation, and the result is notified to the user.

Thus, by the notification, the user can detect the installation defect of the onboard camera 10 or the vehicle body deformation, and take an action of vehicle repair or the like.

Fifth Embodiment

An image processing system of a fifth embodiment is configured, like the fourth embodiment, to be able to determine whether the positional deviation of the feature point on the photographed image by the onboard camera 10 is due to the installation defect of the onboard camera 10 or due to the vehicle body deformation, and inform the user of the determination result.

Figure 9:
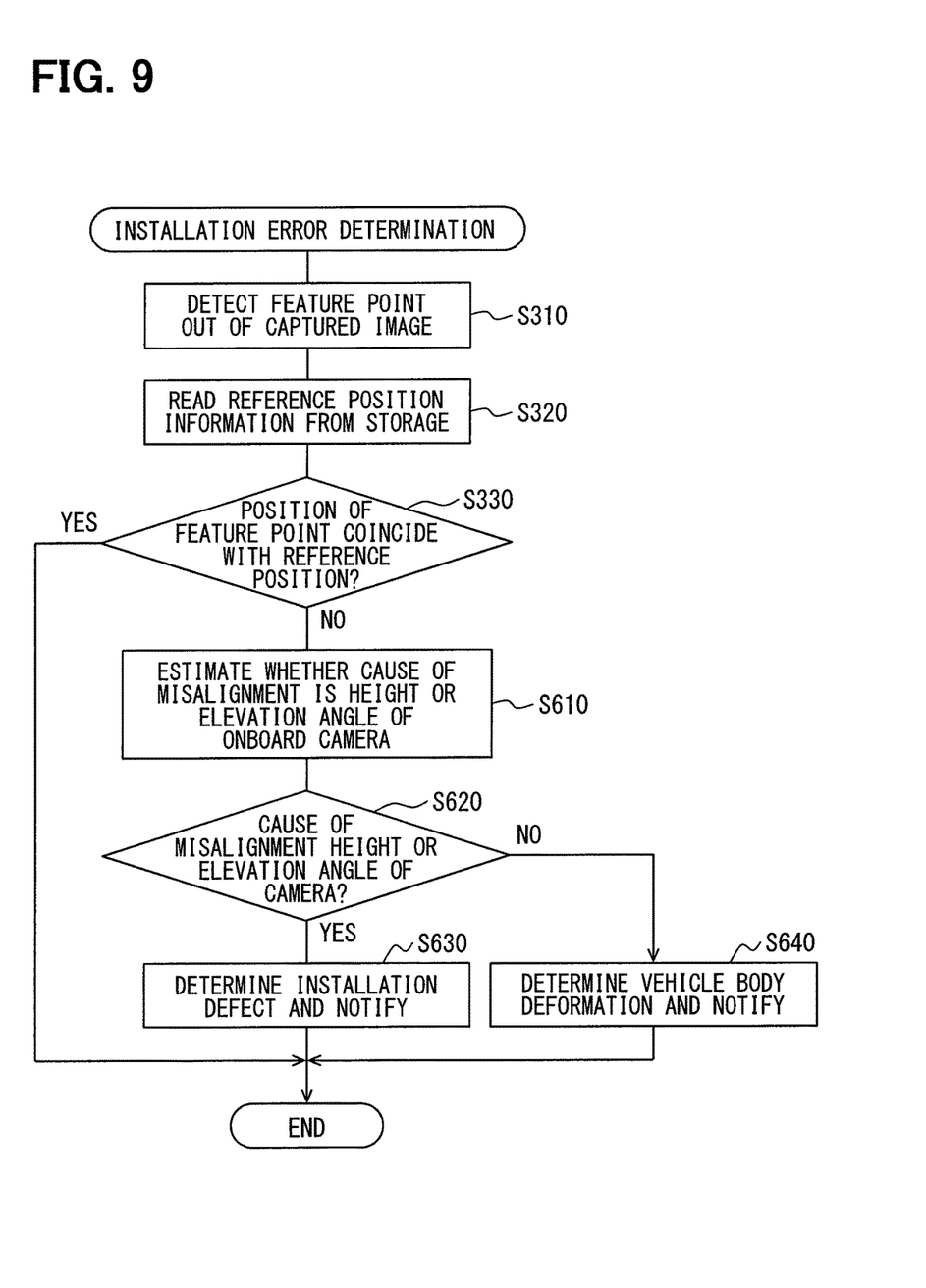
FIG. 9 is a flowchart showing installation error determination processing of a fifth embodiment.

Then, difference from the image processing system of the fourth embodiment is only a procedure at the time of specifying the cause of the positional deviation of the feature point on the photographed image; therefore, in the present embodiment, this difference is explained and explanations about other things such as configuration are omitted.

As shown in FIG. 9, in the installation error determination processing of the present embodiment, in S330, when the position of the feature point is determined not to coincide with the reference position, the flow shifts to S610, where it is estimated whether the cause of the positional deviation of the feature point is due to deviation of the onboard camera 10 in a height direction (z-axis direction) or an elevation angle direction (pitch direction).

For example, in S610, the photographed image is corrected by varying a coordinate in the height direction (z-axis direction) and a pitch angle around the a y-axis within a predetermined error range among parameters that constitute the position information of the onboard camera 10 stored in the storage portion 26, and it is estimated whether the cause of the positional deviation is due to displacement in the height direction of the onboard camera 10 or due to displacement in the elevation angle direction by determining whether the amount of positional deviation of the feature point on the photographed image becomes a minimum.

In S620, it is determined whether the cause of the positional deviation of the feature point on the photographed image is due to the displacement in the height direction or the elevation angle direction of the onboard camera 10 as a result of the estimation by S610.

Then, in S620, when the cause of the positional deviation of the feature point on the photographed image is determined to be due to the displacement in the height direction or in the elevation angle direction of the onboard camera 10, in S630, the cause is determined to be due to the installation defect of the onboard camera 10, the determination is notified to the user, and the installation error determination processing of the camera terminates.

In S620, when the cause of the positional deviation of the feature point on the photographed image is determined to be due to neither displacement of the onboard camera 10 in the height direction nor that in the elevation angle direction, in S640, the cause is determined to be due to the vehicle body deformation, the determination is notified to the user, and the installation error determination processing of the camera terminates.

Incidentally, a reason of determining in this way is that normally the onboard camera 10 is installed being displaceable in the vertical (z-axis) direction and in the elevation angle direction (pitch) to the vehicle 2, and does not displace in front-rear (x-axis), horizontal (y-axis), roll-angle, and yaw-angle directions.

Then, according to the image processing system of the present embodiment, when it is specified whether the positional deviation of the feature point on the photographed image by the onboard camera 10 is due to the installation defect of the onboard camera 10 or due to the vehicle body deformation, what is necessary is just to vary only parameters in the vertical (z-axis) direction and the elevation-angle (pitch) direction in the position information of the onboard camera 10; therefore, calculation processing in the control portion 28 can be simplified as compared with the image processing system of the fourth embodiment.

In the above, although the embodiments of the present disclosure were explained, the present disclosure is not limited to the above-mentioned embodiments, and can take various modes within a limit that does not deviate from the gist of the present disclosure.

For example, in the above-mentioned embodiments, the explanations were given assuming that the onboard camera 10 was disposed in the rear of the vehicle 2, and was used in photographing a peripheral image of the rear of the vehicle.

However, the onboard camera 10 may be disposed on the front side of the vehicle 2 to be used in photographing a peripheral image ahead of the vehicle, or may be disposed on right and left sides of the vehicle 2 to be used in photographing a peripheral image on the sides of the vehicle.

Further, when the onboard camera 10 is disposed ahead of the vehicle 2, what is necessary is just to detect end parts of the bumper disposed on the front side of the vehicle 2 and a bonnet of the vehicle 2 as the feature point of the vehicle 2.

Moreover, in the case where the onboard camera 10 is disposed on the side of the vehicle 2, what is necessary is just to detect an edge portion seeing a side door of the vehicle 2 from information as the feature point of the vehicle 2.

The control portion 28 and S220 each corresponds to a feature point superimposition portion of the present disclosure. The control portion 28 and S230 each corresponds to an image output portion. The control portion 28 and S310 each corresponds to a feature point detection portion. The control portion 28 and S330 each corresponds to a determination portion. The control portion 28 and S330 each corresponds to a notification portion.

Each of the flowcharts or the processes in the flowcharts shown in the present application may include multiple steps (or referred to also as sections). Each of the steps is represented as, for example, S110. Each of the steps may further be divided into sub-steps. Furthermore, several steps may be combined to form one step.

The invention claimed is:

1. An installation error detection apparatus of an onboard camera, the installation error detection apparatus receiving a photographed image by the onboard camera installed to a vehicle so as to photograph a periphery of the vehicle and being used to determine whether an installation position of the onboard camera is a proper position, the installation error detection apparatus comprising:
   an input portion that receives the photographed image;
   a storage portion that stores position information of a feature point of the vehicle appearing in the photographed image when the onboard camera is installed to the proper position;
   a feature point detection portion that detects the feature point of the vehicle out of the photographed image received from the input portion;
   a determination portion that determines whether the installation position of the onboard camera is the proper position based on a position of the feature point in the photographed image detected by the feature point detection portion and the position information stored in the storage portion; and
   a notification portion that, when the determination portion determines that the installation position of the onboard camera is improper, informs installation defect of the onboard camera, wherein:
   the notification portion calculates the installation position of the onboard camera required to minimize the deviation amount based on the deviation amount between position information of the feature point detected by the feature point detection portion and the position information stored in the storage portion and corrects the photographed image by the onboard camera based on a calculated installation position of the onboard camera, when the determination portion determines that the installation position of the onboard camera is improper;
   the notification portion detects the feature point of the vehicle out of the photographed image after correction and calculates a similarity degree of the position of the feature point and the position information stored in the storage portion;
   the notification portion determines the installation defect of the onboard camera and informs the installation defect in a case where the similarity degree is less than a threshold value set in advance; and
   the notification portion determines that a vehicle body is deformed and informs the vehicle body being deformed in a case where the similarity degree is more than or equal to the threshold value.

* * * * *